United States Patent [19]

Brimberg et al.

[11] Patent Number: 5,042,942
[45] Date of Patent: Aug. 27, 1991

[54] LASER LOCATION APPARATUS FOR UNDERWATER BODIES

[75] Inventors: Frederick Brimberg, Severna Park, Md.; Irving Liberman, Pittsburgh, Pa.

[73] Assignee: Westinghouse Electric Corp., Pittsburgh, Pa.

[21] Appl. No.: 559,109

[22] Filed: Jul. 25, 1990

[51] Int. Cl.$^5$ .......................... G01C 3/00; G01C 5/00; G01B 11/26; G01V 1/38

[52] U.S. Cl. ........................................ 356/1; 356/141; 356/152; 367/19

[58] Field of Search ....................... 356/1, 5, 141, 152; 367/19

[56] References Cited

U.S. PATENT DOCUMENTS 4,290,043 9/1981 Kaplan ..................... 356/5
4,518,254 5/1985 Penny et al. ............... 356/5
4,764,982 8/1988 Pfund ....................... 356/152

*Primary Examiner*—Stephen C. Buczinski
*Attorney, Agent, or Firm*—D. Schron

[57] ABSTRACT

A laser beam is projected from either an underwater body or an overhead support platform, with the laser energy being detected by the other piece of apparatus using a photo detector. Either the projecting or the receiving optics is servo driven to maximize the light energy received by the photo detector. The relative position of the underwater body with respect to the support platform, typically a tracking aircraft, is determined by measuring the position of a driven element laser or photo detector, in either one or two planes, i.e., two or three dimensions, to provide a measure of the trailing distance and when desirable, the lateral offset distance.

26 Claims, 4 Drawing Sheets

LASER LOCATION APPARATUS FOR UNDERWATER BODIES

BACKGROUND OF THE INVENTION

This invention relates generally to apparatus for determining the spatial location of an object and more particularly to apparatus for determining the position of an underwater body relative to a support platform on or above the sea surface.

When operating an underwater body from an overhead support platform, such as an aircraft, it is often necessary to accurately and continuously measure the relative position of the body with respect to the support platform. Present known methods for accomplishing this type of position determination comprise methods including acoustic tracking and calculation techniques. Acoustic tracking typically utilizes an acoustic beacon or transponder normally mounted on the body to be located with a directional receiver located on the tracking support platform. While such apparatus can provide accurate measurements, it requires the support platform to insert a receiving array into the water and is thus limited to relatively low speeds of advance through the water due to the flow noise induced by or in the receiving hydrophone array. This often presents a substantial problem when the support platform is a high speed craft such as an aircraft or air cushion vehicle.

Calculation of the position of an underwater body in such an arrangement also involves measuring tow cable parameters such as length, exit angle from the tow craft, and tow tension or body depth below the surface. Errors in body position due to water currents cannot be accounted for and the method is limited to towed bodies as opposed to tethered and autonomous undersea craft. A variant of the method of calculation also involves the calculation of a dead reckoning position using various sensors in conjunction with an inertial platform. Such equipment is relatively expensive and requires periodic calibration from an external position source to compensate for accumulated errors.

Accordingly, it is an object of the present invention to provide an improvement in the method and apparatus for determining the position of a body relative to a support platform.

It is another object of the invention to provide an improvement in method and apparatus for determining the position of an underwater body relative to a tracking craft on or above the water surface.

It is yet a further object of the invention to provide a method and apparatus for determining the relative position of an underwater body relative to an aircraft through the use of a beam of laser energy.

SUMMARY

Briefly, the foregoing and other objects of the invention are achieved by projecting a laser beam from either an underwater body or an overhead support platform, with the laser energy being detected by the other piece of apparatus using a photo detector. Either the projecting or the receiving optics or both are servo driven to maximize the light energy received by the photo detector. The relative position of the underwater body with respect to the support platform, typically a tracking aircraft, is determined by measuring the position of a driven element laser or photo detector, in either one or two planes, i.e., two or three dimensions, to provide a measure of the trailing distance and when desirable, the lateral offset distance.

BRIEF DESCRIPTION OF THE DRAWINGS

The following detailed description of the invention will be more readily understood when considered together with the accompanying drawings in which.

DETAILED DESCRIPTION OF THE INVENTION

Figure 1A:
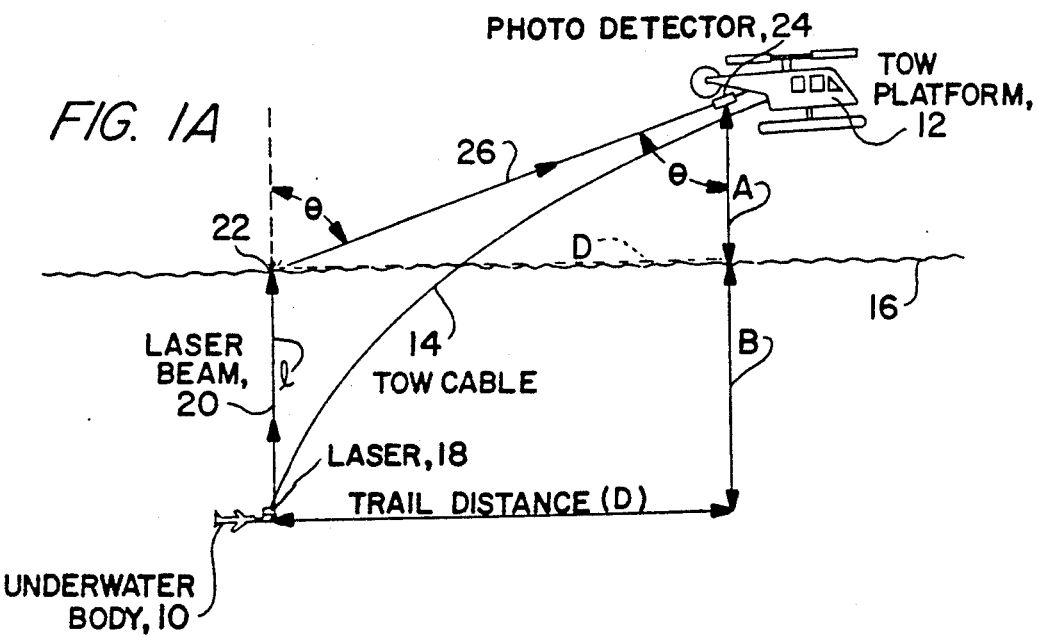
FIGS. 1A and 1B comprise a side planar view and a top planar view, respectively, of a first mode of operation where laser energy is directed vertically upward from an underwater body.
Figure 1B:
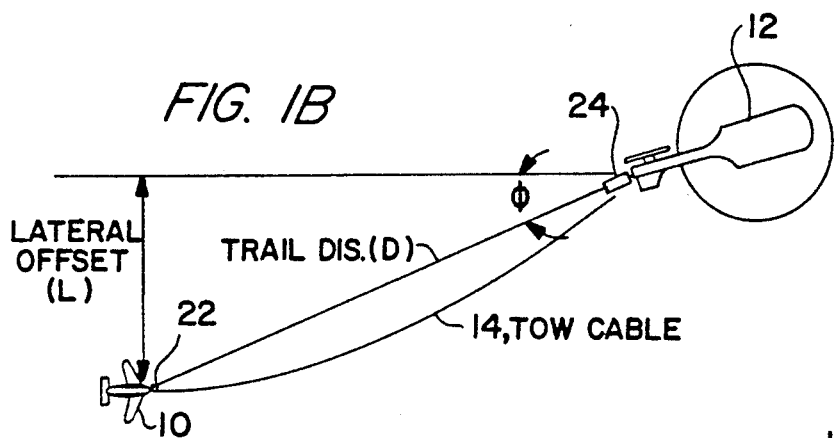

Referring now to the drawings wherein like reference numerals refer to like elements throughout, reference will be made first to FIGS. 1A and 1B where reference numeral 10, for example, denotes an underwater body which is being towed by an overhead support platform 12 which is shown, for purposes of illustration, as a helicopter.

The underwater body 10 which may be, for example, a sled or other known type of apparatus, is connected to the support platform 12 by a tow cable 14. As shown in FIG. 1A, the helicopter 12 is located at an altitude A above the sea surface 16, with the underwater body 10 being submerged at a depth B.

In the first embodiment, a vertically stabilized laser device 18 projects a laser beam 20 directly upward toward the surface 16. The laser device 18, moreover, includes means, not shown, for compensating for the effects of body roll and pitch so that the beam 20 intersects the sea surface directly above the towed body where scattering of light occurs at a spot 22 on the sea surface.

Figure 5:
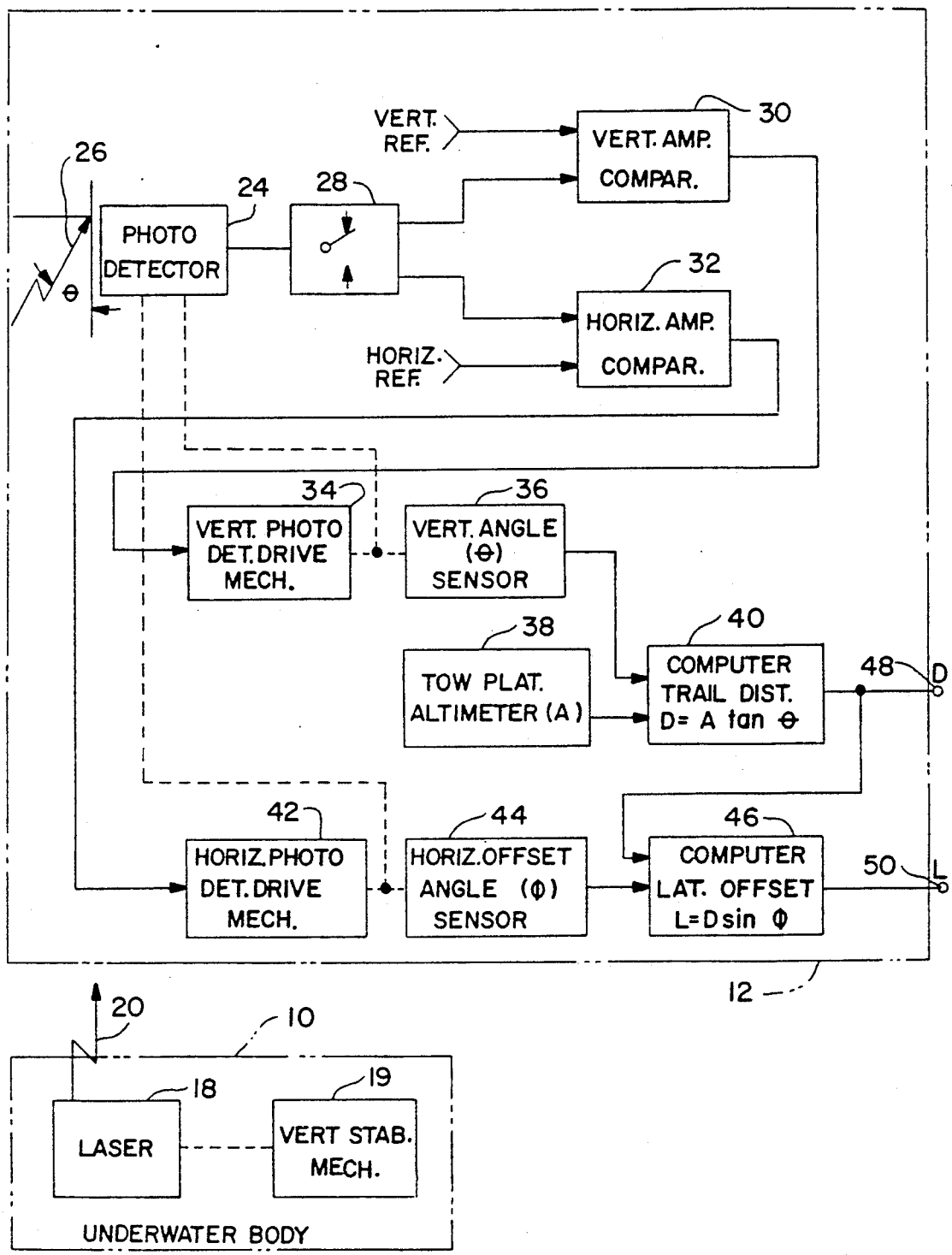
FIG. 5 is an electrical block diagram of apparatus for determining the trail distance and lateral offset for the configuration shown in FIGS. 1A and 1B.

A photo sensor assembly, which can be directed both in azimuth and elevation, is mounted on the rear of the helicopter support platform 12 and includes a photo detector 24 which is directed to the spot 22 on the sea surface 16. By measuring the elevation, i.e. the depression angle $\theta$ relative to vertical and the azimuth angle $\phi$ and knowing the height A of the photo detector assembly 24 above the sea surface 16, the towed body trail distance D can first be calculated by a simple method of triangulation as shown in FIG. 1A, i.e. $D = A \tan \theta$. When the trail distance D is known, the lateral offset L can similarly be calculated as shown in FIG. 1B from the relationship $L = D \sin \theta$. Apparatus for calculating both the trail distance D and the lateral offset distance L, is shown in FIG. 5 and will be referred to subsequently.

Figure 2:
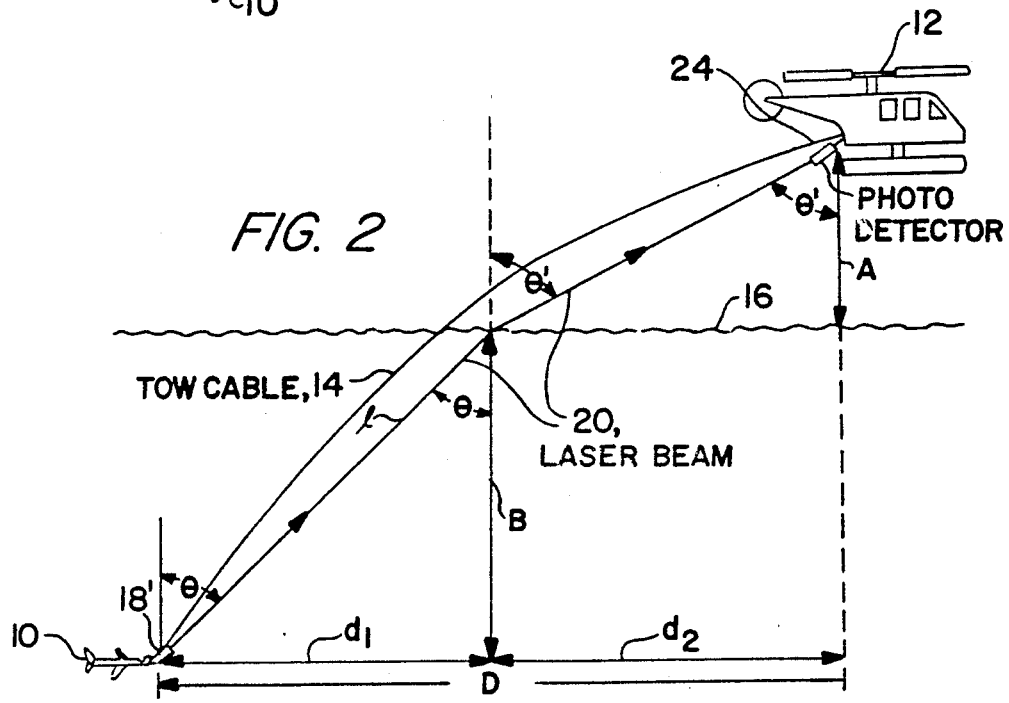
FIG. 2 is a side planar view illustrative of a second mode of operation where laser energy is aimed directly toward an aircraft type support platform from the underwater body and because the laser beam path traverses an abrupt change in index of refraction at the water to air interface, the beam direction changes at the interface.

Referring now to FIG. 2, the embodiment shown thereat is illustrative of a second mode of operation where the laser beam 20 generated by the laser device 18 is aimed at a photo detector 24 on the support platform 12. By knowing the altitude A of the helicopter 12 and the depth B of the towed body 10, the same calculations can be made by measuring the aiming angles $\theta$ and $\phi$ of the laser 18, and by relating $\theta$ to $\theta'$ through Snell's law of refraction as: $n \sin \theta = \sin \theta'$, where $n = 1.33$, the index of refraction of water. However, now $D = d_1 + d_2$, where $d_1 = B \tan \theta$ and $d_2 = A \tan \theta'$.

Figure 3:
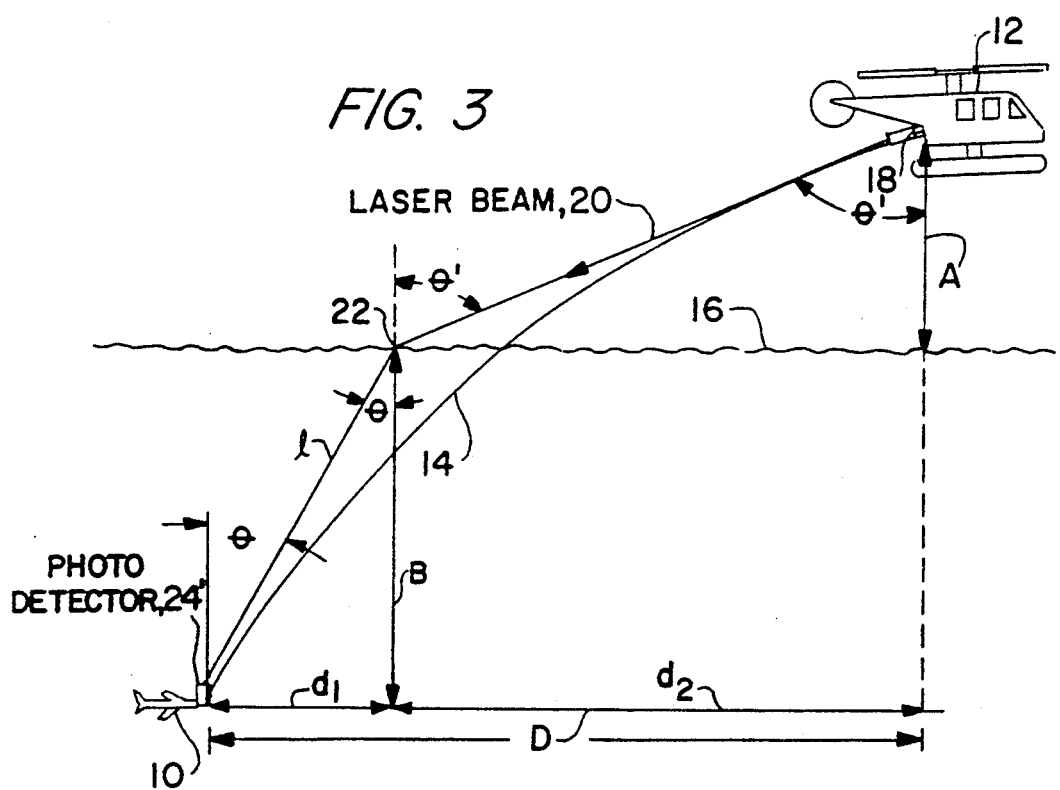
FIG. 3 is a side planar view illustrative of a third mode of operation where laser energy is directed from the aircraft support platform to a spot on the surface of the water above the underwater body.
Figure 4:
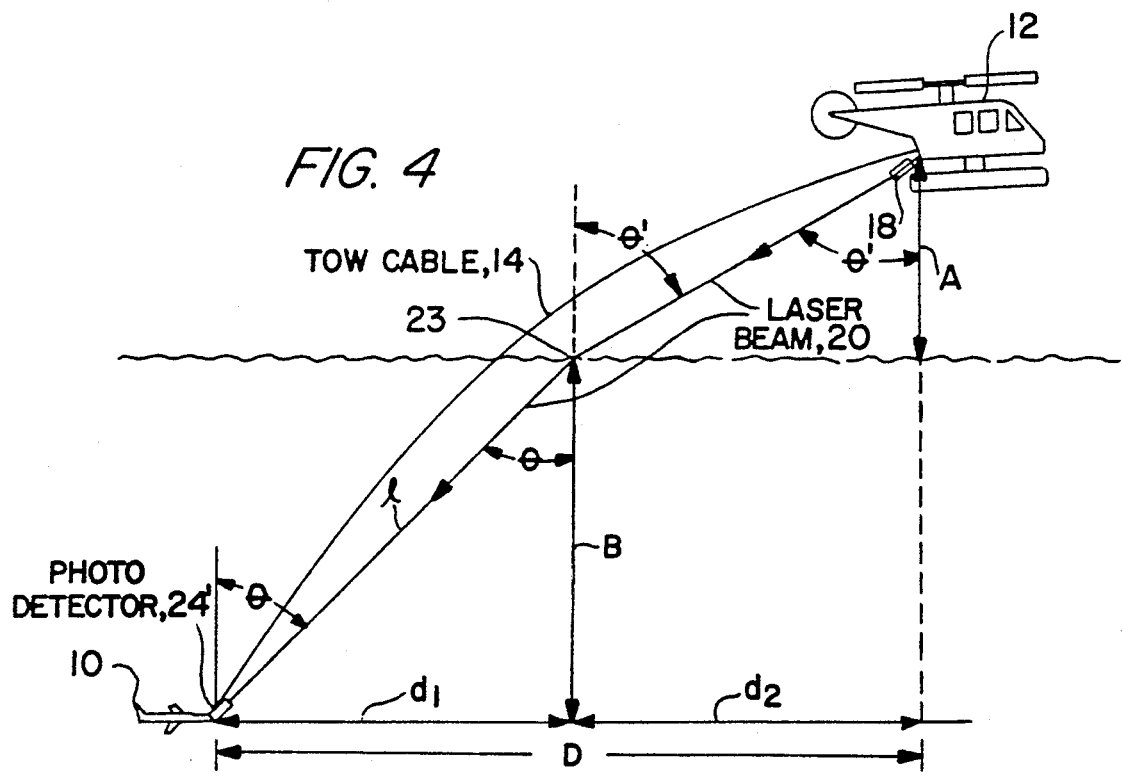
FIG. 4 is a side planar view illustrative of a fourth mode of operation where laser energy is aimed toward the underwater body from the aircraft support platform.

Referring now to FIGS. 3 and 4, the configurations shown thereat comprise third and fourth modes of operation where the location of the laser 18 and photo detector 24 are reversed with respect to modes 1 and 2, respectively, and which have been described with reference to FIG. 1A, 1B, and FIG. 2. As shown in FIG. 3 and 4, the laser device 18 is mounted on the rear of the helicopter 12 and the photo detector 24 is located on the towed underwater body 10. The laser beam 20 is aimed at a spot 23 on the water surface 16 directly in line with the flight path of the aircraft 12 and approximately at the range of the towed underwater body 10. In the fourth mode (FIG. 4), the laser beam 20 from the aircraft 12 is pointed as accurately as possible at the towed underwater body 10.

The following discussion is illustrative of the parameters which must be considered in the implementation of the various operational modes shown in FIGS. 1-4. The transmission T of light in water for a given path length l can be expressed as:

$$T = I/I_o = \exp(-\alpha l)$$

where I is the final intensity for the path length l, $I_o$ is the initial intensity at the source, for example, and $\alpha$ is the diffuse attenuation coefficient. Sea water is known to have a wide range of $\alpha$'s depending on the wavelength and the water quality. Where, for example, the laser device 18 includes a Q switched frequency doubled Nd:YAG laser operating at a wavelength of 532 nm, experimentation has shown that the poorest type of ocean water defined as Type III, has an $\alpha$ of 0.12 m$^{-1}$. Type II water, which comprises relatively cleaner water, exhibits an $\alpha$ of 0.08 m$^{-1}$. For a path length $l = 270$ m and a depth $D = 180$ m, the transmission T in Type III water, for example, is approximately $10^{-14}$, while for Type II water, the transmission T is approximately $4 \times 10^{-10}$. Since there are $2.7 \times 10^{18}$ photons/joule at 532 nm, then for Type III water, $2.7 \times 10^4$ photons/joule reach the surface 16 in FIG. 2, while for a Type II water, $10^9$ photons/joule reach the surface. Because waves tend to scatter light and because it is necessary to spread the light sufficiently to ensure that a portion of it reaches the photo detector 24 on the aircraft 12, one may assume that approximately $10^{-4}$ of the light reaching the surface 16 in a 30 cm spot 23, for example, will reach a photo detector 24 having collection optics, not shown, in the order of 25 cm in diameter. Accordingly, for a Type III water, three photons/joule reach the photo detector 24, while for Type II water $10^5$ photons/joule reach the detector.

With respect to the third operational mode a shown in FIG. 3, however, nearly all the photons emitted by the laser 18 located on the rear of the aircraft support platform 12 reaches the water surface 16 in a spot 23 of, for example, 30 cm diameter or less. The waves then scatter the radiation into the water and if the scattering is Lambertain, about $2 \times 10^{-7}$ will be scattered within a collected aperture of 25 cm diameter at a depth of 180 m. The light will also be attenuated by the path 21 in water corresponding to the depth $B = 180$ m, for which the transmission T in Type III water will be $4 \times 10^{-10}$, while for Type II water, the transmission T is $6 \times 10^{-7}$. Thus approximately 200 photons/joule reach the detector 24 on the underwater for Type III water, and approximately $3 \times 10^5$ photons/joule reach the photo detector 24 for Type II water.

Considering the photo sensor assembly 24, in all embodiments it typically comprises a relatively simple detector comprised of a standard charge coupled device (CCD) video camera including an image intensifier located on the front end together with a spectral filter. The pixel spacing on the detector can correspond to the desired spatial resolution of the laser spot on the water and with hundreds of elements in each of two dimensions, the field of view can be relatively large. By range gating the intensifier to the relatively short time that the Q-switched laser 18 is activated, for example, 100 ns, and by delaying the range gate to compensate for the time of travel of the light from the laser to the detector, and by spectral filtering at a wavelength, for example, 0.2 nm, the solar background can be reduced to a negligible level.

In all four configurations, not only can the location of the towed body 10 be determined with reference to the support platform 12, but also lateral control can be added to the towed body 10 when desired so that it can be made to follow a specific course behind the support platform 12. This is particular applicable to the scheme shown in FIG. 3 where the underwater body 10 can be made to actively guide itself to a position directly beneath the spot 23. Or more simply, the laser spot 23 can be aimed directly over the underwater body from the image on the photo detector 24.

Having considered the optical and mechanical aspects of the invention, reference will now be made to FIGS. 5 and 6 which depict two illustrative embodiments of electrical apparatus for determining the trail distance D and the lateral offset distance L of the underwater body 10 behind the support platform. The configuration shown in FIG. 5 would be used in connection with the arrangement shown in FIGS. 1A and 1B, while the configuration shown in FIG. 6 would be utilized in connection with the arrangement shown in FIG. 2.

Referring first to FIG. 5, the underwater body 10 includes a laser 18 which is vertically stabilized by the mechanism 19 and generates a vertical beam 20 and where the photo detector 24 receives an angulated beam 26, the determinations of the trail distance D and the lateral offset L are made sequentially, since the computation of the lateral offset L requires the a priori knowledge of the trail distance D. Accordingly, as shown in FIG. 5, a signal sequencer 28 is adapted to feed the output of the photo detector 24 first to a vertical amplitude comparator 30 and then to a horizontal amplitude comparator 32. Considering first the vertical signal channel which is used to determine the trail distance D, the output of the vertical amp comparator 30 which additionally receives a reference amplitude as an input, is coupled to a vertical drive mechanism 34 which is mechanically coupled both to the photo detector 24 and a vertical angle θ sensor 36. The vertical drive mechanism 30, the vertical amplitude comparator 32 and the photo detector 24 form a closed servo loop inasmuch as the output of the vertical amplitude comparator 30 comprises an error signal which causes the vertical drive mechanism 34 to slew the position of the photo detector 24 in the vertical plane to maximize the light input to the photo detector 24 with the angle sensor 26 providing an output corresponding to the angle θ. The towing support platform 12 additionally includes an altimeter 38 which provides an electrical output signal A, corresponding to the height of the aircraft above the sea surface 16. These two signals are fed into apparatus 40 for implementing the computation:

$$D = A \tan \theta.$$

Having determined the parameter D, the sequencer 28 switches to couple the photo detector 24 to a horizontal amplitude comparator 32 which also receives a reference amplitude input. The output of the horizontal amplitude comparator 32 is coupled to a horizontal drive mechanism 42 which is mechanically coupled to the photo detector 24 and a horizontal offset angle sensor 44 which provides an electrical output signal corresponding to the offset angle $\phi$. This signal is fed along with the previously computed signal D to second apparatus 46 for implementing the equation:

$$L = D \sin \phi$$

and outputs a signal in accordance with an offset distance L.

Accordingly, as shown in FIG. 5, a pair of output terminals 48 and 50 provide signals corresponding to the calculated distances D and L which can thereafter be used in any desired manner.

Figure 6:
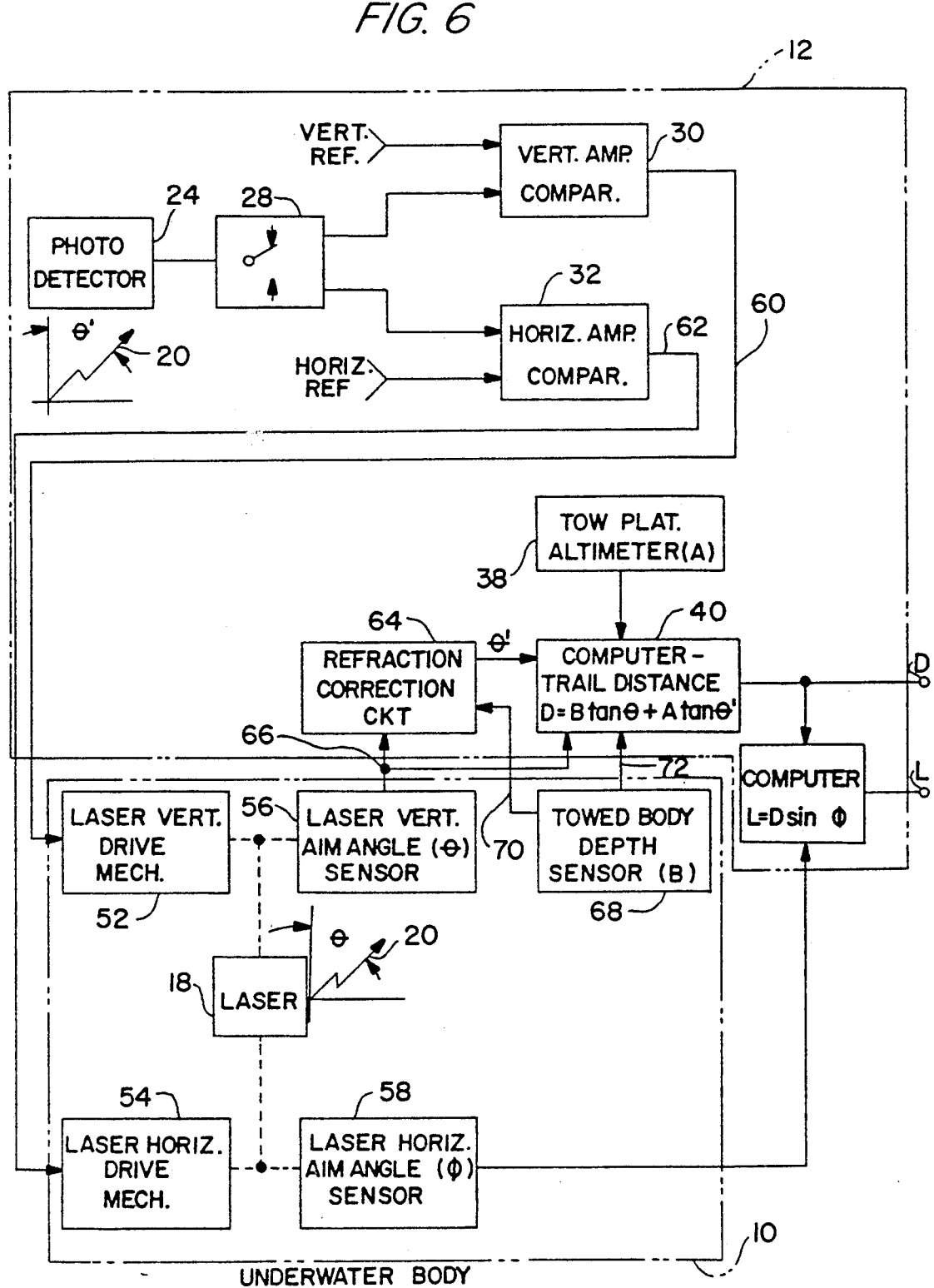
FIG. 6 is an electrical block diagram illustrative of apparatus for determining the trail distance and lateral offset for the configuration shown in FIG. 2.

Referring now to FIG. 6, it should be noted that in addition to the laser 18 being located on the underwater body 10, there is also included apparatus thereon for aiming the laser 18' both in elevation (θ) and azimuth ($\phi$) directly at the photo detector 24 on the support platform as shown in FIG. 2. This again involves the use of vertical and horizontal drive mechanisms 52 and 54 which are mechanically coupled to the laser 18 along with respective vertical and horizontal aim angle sensors 56 and 58. The vertical and horizontal drive mechanisms 52 and 54 are also coupled to and receive inputs from the outputs of respective vertical amplitude and horizontal amplitude comparators 30 and 32 which are located on the aircraft 12. This necessitates the use of interconnecting signal lines 60 and 62 being associated with the tow cable 14.

Inasmuch as the laser beam 20 (FIG. 2) incurs a medium transition from sea water to air at the sea surface 16, the output of the vertical aim angle θ sensor 56 must have a correction for refraction as a result of the water-air interface and accordingly the output of the sensor 56 is coupled to a refraction correction circuit 64 located, for example, on the support platform 10 which also requires a signal line 66 running between the underwater body 10 and the aircraft 12. The refraction correction circuit 64 would typically include an analog to digital converter, the output of which is coupled to a digital look-up table having predetermined correction values calculated in accordance with Snell's law as a function of depth B of the underwater body 10. A signal corresponding to depth B accordingly is fed from a depth sensor 68 via signal line 70 to the refraction correction circuit 64 so that a corrected angle θ' signal is fed to apparatus 40' for computing the trail distance according to the equation:

$$D = B \tan \theta + A \tan \theta',$$

where n sin θ = sin θ' and n is the index of refraction of water, i.e., approximately 1.33.

The depth parameter signal B is also connected to the computation apparatus 40' via a signal line 72. The signal lines 66, 70 and 72 would also run coextensive with the aforementioned signal lines 62 and 60 along the tow cable 14. Following the calculation of the trail distance D, the computing apparatus 46 would then compute the horizontal offset value L as in FIG. 5 and output signals corresponding to D and L at output terminals.

With respect to the embodiments of FIGS. 3 and 4, they would entail apparatus essentially the same as shown in FIGS. 5 and 6 for determining the values D and L with only the locations of the laser 18 and photo detector 24 being interchanged. Also the calculation would now involve the depressing angle θ' sensed at the laser source 18 and the elevation angle θ as sensed at the photo detector 24'.

Thus the invention as described heretofore permits the determination of the underwater body position to be made independent of underwater body velocity. Furthermore, it requires no preexisting field of acoustic transponders whose positions are surveyed on the sea floor and is not subject to errors from ocean current, magnetic anomalies or drift.

Having thus shown and described what is considered to be the preferred method and embodiment for implementing the subject invention, it is to be noted that the same has been made by way of illustration and not limitation. Accordingly, all modifications, alterations and changes coming within the spirit and scope of the invention are herein meant to be included.

We claim:

1. A system for spatially locating an underwater moving body relative to an overhead moving body, comprising:
    a source of laser energy located on one of said bodies;
    a detector of laser energy located on the other of said bodies;
    means for providing a measure of the vertical distance separating said bodies including a measure of the altitude of said overhead body and a measure of the depth of said underwater body;
    means for directing said source of laser energy to a predetermined point in space at or between said bodies for the reception of laser energy by said detector, said point having an elevation angle related to the vertical distance separating said bodies;
    means for providing a measure of the elevation angle; and
    means for calculating by triangulation the horizontal distance separating said bodies in response to at least the measure of said altitude and said elevation angle.

2. The system as defined by claim 1 wherein said source of laser energy is located on said underwater body and said detector is located on said overhead body.

3. The system as defined by claim 1 wherein said source of laser energy is located on said overhead moving body and said detector is located on said underwater body.

4. The system as defined by claim 1 wherein said point in space is on the surface of a body of water separating said bodies.

5. The system as defined by claim 4 wherein said point in space is directly above said underwater body.

6. The system as defined by claim 4 wherein said point in space is a point on the sea surface in the vicinity of a point above the underwater moving body.

7. The system as defined by claim 1 wherein said point in space is substantially at the location of said detector.

8. A system for spatially locating an underwater moving body relative to an overhead moving body, comprising:
 a source of laser energy located on one of said bodies;
 a detector of laser energy located on the other of said bodies;
 means for providing a measure of the vertical distance separating said bodies including a measure of the altitude of said overhead body and a measure of the depth of said underwater body;
 means for directing said source of laser energy to a predetermined point in space at or between said bodies for the reception of laser energy by said detector, said point having an elevation angle related to the vertical distance separating said bodies;
 means for providing a measure of the elevation angle;
 means for calculating by triangulation the horizontal distance separating said bodies in response to at least the measure of said altitude and said elevation angle;
 means for providing a measure of the azimuth angle separating said bodies; and
 means for calculating by triangulation the lateral offset distance between said bodies in response to the measure of said horizontal distance and said azimuth angle.

9. The system as defined by claim 8 wherein said overhead moving body comprises an aircraft.

10. The system as defined by claim 9 wherein said source of laser energy is located on said underwater body,
 said detector is located on said aircraft,
 wherein said point in space is a spot on the surface of a body of water in which said underwater body is located, and
 additionally including,
 servo mechanism means on said aircraft at said detector for causing said detector to track said spot in elevation and azimuth, and
 means coupled to said servo mechanism means for providing a measure of said elevation angle and a measure of said azimuth angle.

11. The system as defined by claim 9 wherein said source of laser energy is located on said underwater body,
 said detector is located on said aircraft and said spot in space comprises a spot substantially at said detector, and
 additionally including,
 servo mechanism means on said underwater body at said source of laser energy for aiming said source at said detector, and
 means coupled to said servo mechanism means for providing a measure of said elevation angle and a measure of said azimuth angle.

12. The system as defined by claim 11 and additionally including means coupled to said means for providing a measure of said elevation angle for providing a refraction correction of said elevation angle caused by the change of transmission medium at the surface interface between air and water.

13. The system as defined by claim 12 wherein said means for calculating the horizontal distance is responsive to a combined measure of said altitude and said depth as well as said elevation angle.

14. The system as defined by claim 9 wherein said source of laser energy is located on said aircraft,
 said detector is located on said underwater body, and
 wherein said point in space is a spot on the surface of a body of water in which said underwater body is located.

15. The system as defined by claim 9 wherein said source of laser energy is located on said aircraft,
 said detector is located on said underwater body and said spot in space comprises a spot substantially at said detector, and
 additionally including servo mechanism means on said aircraft at said source of laser energy for aiming said source at said detector, and
 means coupled to said servo mechanism means for providing a measure of said elevation angle and a measure of said azimuth angle.

16. The system as defined by claim 15 and additionally including means coupled to said means for providing a measure of said elevation angle for providing a refraction correction of said elevation angle caused by the change of transmission medium at the surface interface between air and water.

17. The system as defined by claim 16 wherein said means for calculating the horizontal distance is responsive to a combined measure of said altitude and said depth as well as said elevation angle.

18. The system as defined by claim 10 wherein said means for calculating horizontal distance includes means for performing the calculation $D = A \tan \theta$, where D is said horizontal distance, A is said measure of altitude, and $\theta$ is said measure of beam angle measured from the vertical.

19. The system as defined by claim 18 wherein said means for calculating the lateral offset distance includes means for performing the calculation $L = D \sin \phi$, where L is said lateral offset distance and $\phi$ is said measure of azimuth angle.

20. The system as defined by claim 12 wherein said means for calculating horizontal distance includes means for performing the calculation $D = B \tan \theta + A \tan \theta'$, where D is said horizontal distance, A is said measure of altitude, B is said measure of depth, and $\theta$ and $\theta'$ are said measure of beam angles in water and air measured from the vertical corrected for refraction.

21. A method for spatially locating an underwater moving body relative to an overhead moving body such as an aircraft, comprising the steps of:
 locating a source of laser energy on one of said bodies;
 locating a detector of laser energy on the other of said bodies;
 determining the vertical distance separating said bodies including the altitude of said overhead body and the depth of said underwater body;
 directing said source of laser energy to a predetermined point in space at or between said bodies for the reception of laser energy by said detector, said point having an elevation angle related to the vertical distance separating said bodies;

determining the elevation angle; and determining by triangulation the horizontal distance separating said bodies in response to at least the measure of said altitude and said elevation angle.

22. The method as defined by claim 21 wherein said source of laser energy is located on said underwater body and said detector is located on said overhead body.

23. The method as defined by claim 21 wherein said source of laser energy is located on said overhead moving body and said detector is located on said underwater body.

24. The method as defined by claim 21 wherein said point in space is on the surface of a body of water separating said bodies.

25. The method as defined by claim 24 wherein said point in space is directly above said underwater body.

26. A method as defined by claim 21 and additionally including the steps of:

determining the azimuth angle separating said bodies; and determining by triangulation the lateral offset distance between said bodies in response to the measure of said horizontal distance and said azimuth angle.

* * * * *